US006356359B1

(12) United States Patent
Motamed

(10) Patent No.: US 6,356,359 B1
(45) Date of Patent: Mar. 12, 2002

(54) TONER USAGE ESTIMATION SYSTEM

(75) Inventor: Margaret Motamed, Foster City, CA (US)

(73) Assignee: Electronics for Imaging, Inc, Foster City, CA (US)

( * ) Notice: Subject to any disclaimer, the term of this patent is extended or adjusted under 35 U.S.C. 154(b) by 0 days.

(21) Appl. No.: 09/009,144

(22) Filed: Jan. 20, 1998

(51) Int. Cl.[7] .................... G06K 15/00
(52) U.S. Cl. .................... 358/1.8; 358/1.9
(58) Field of Search .................... 395/108, 109; 355/112, 115, 126; 358/1.8, 1.9; 382/162, 167

(56) References Cited

U.S. PATENT DOCUMENTS 5,204,699 A * 4/1993 Birnbaum .................... 355/208
5,349,377 A * 9/1994 Gilliland et al. .................... 355/245
5,383,129 A * 1/1995 Farrell .................... 355/308
5,592,298 A * 1/1997 Caruso .................... 358/298
5,604,578 A 2/1997 Shibuya et al. .................... 399/178
5,734,801 A * 3/1998 Noguchi et al. .................... 395/109
5,838,333 A * 11/1998 Matsuo .................... 345/431
5,859,711 A * 1/1999 Barry et al. .................... 358/296

FOREIGN PATENT DOCUMENTS

EP 893909 A2 1/1999 .................... H04N/1/29

* cited by examiner

*Primary Examiner*—Yon J. Couso
(74) *Attorney, Agent, or Firm*—Michael A. Glenn; Don Hendricks

(57) ABSTRACT

A toner usage estimation system is provided, in which an image file is analyzed to determine the relative usage of one or more toners used to define an image on a substrate. The image file is analyzed as a basis for estimating the cost of processing a particular print job. In one embodiment, a pixel coverage counter is added in the hardware path of a printer to count pixel coverage mapping, which allows the consumable usage of toner to be determined. In another embodiment, a software approximation on the coverage of toner is determined, based on the use of a reduced resolution thumbnail of an image.

24 Claims, 6 Drawing Sheets

TONER USAGE ESTIMATION SYSTEM

FIELD OF THE INVENTION

The invention relates to the field of printer cost estimation systems. More particularly, the invention relates to a toner usage estimation system to determine the cost of consumable materials for printed documents.

BACKGROUND OF THE INVENTION

Printer manufacturers generally estimate printed page cost based on a rough estimate of 5% toner coverage across a page. While this estimate can provide a comparison of the relative cost of printing an image between different printers, the actual toner page coverage between different printed pages can vary significantly from printer manufacturer's estimates. Therefore, the actual cost per printed page can vary significantly for different print jobs.

The number of toners used in print engines typically varies from one toner (monochrome printing) to four toners (cyan, magenta, yellow, and black)(commonly referred to as CMYK). Some specialized printing processes may use more than four toners, such as an enhanced four color CMYK process that includes the additional application of one or more spot colors.

The cost of consumables in printing processes can be significant, particularly for many color printers that use advanced toners or application techniques, such as for ink jet, thermal wax transfer or dye-sublimation printers.

An exact toner bit map of a page image is generally never held in any memory. With current analog screening techniques, a contone (CMYK)(color) or K (monochrome) image bit map is submitted, as a data stream, to a halftone screening circuit within a printer controller. The printer controller then generates commands to release toner upon a substrate to produce a printed image, based upon the bit map of the page image. The toner is deposited onto the substrate, in a proportion relative to the specified percentage of C, M, Y and K present in the data stream.

M. Farrell, Method of Estimating Cost of Printing Materials Used to Print a Job on a Printing Apparatus, U.S. Pat. No. 5,383,129 (Jan. 17, 1995) discloses a method of estimating the cost of printing materials used to print a job on a printing apparatus, which includes the steps of storing billing rates reflecting the cost of printing materials to be used in printing the job, selecting a first quantity of printing materials to be used in printing the job, and prior to printing the job, calculating as a function of the first selected quantity of printing materials and one of the stored billing rates, a first printing materials cost of the job. While Farrell discloses print cost estimation methods based on a number of stored billing rates and materials costs, he fails to disclose a system for estimating the cost of toner for each job based upon the image file bit map.

Some computer and printer systems provide reduced resolution (thumbnail) images of ripped jobs as previews of images to be printed. While thumbnail images are extremely condensed bit map files of original image files, they provide a reasonably accurate compressed representation of image files.

It would be advantageous to provide a method and apparatus to estimate toner usage for print jobs based on the image data from each job. It would also be advantageous to provide a method to estimate toner usage for print jobs based on thumbnail image bit maps.

While the disclosed prior art system and methodology provides a basic printing cost estimation system, it fails to provide a toner usage estimation system that bases estimations on the image or document files to be printed. The development of such a toner usage estimation system would constitute a major technological advance.

SUMMARY OF THE INVENTION

A toner usage estimation system is provided, in which an image file is analyzed to determine the relative usage of one or more toners used to define an image on a substrate. The image file is analyzed as a basis for estimating the cost of processing a particular print job. In one embodiment, a pixel-coverage counter is added in the hardware path of a printer to count pixel coverage mapping, which allows the consumable usage of toner to be determined. In another embodiment, a software approximation on the coverage of toner is determined, based on the use of a reduced resolution thumbnail of an image.

DETAILED DESCRIPTION OF PREFERRED EMBODIMENTS

Figure 1:
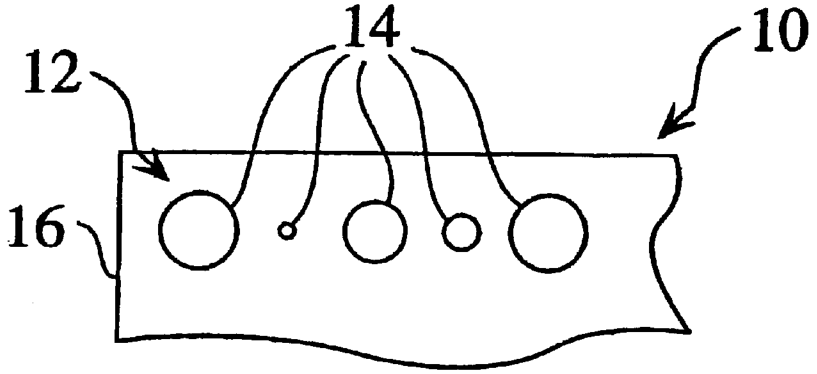
FIG. 1 shows relative pixel toner percentage use between adjacent pixels within an image on a substrate.

FIG. 1 shows the relative pixel toner percentage use 10 between adjacent pixels 14 within an image 12 on a substrate 16. The amount of toner used to define an image 12 typically varies from zero to 100 percent of the size of a pixel 14. For a monochrome image 12, a single toner cartridge 40 (FIG. 5) is used to define an image 12 on a substrate 16.

Figure 2:
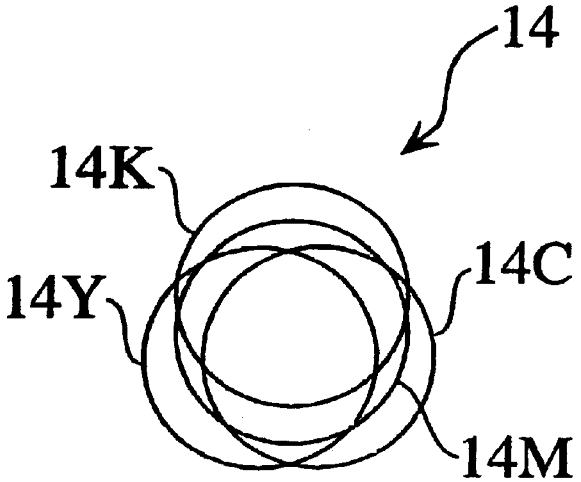
FIG. 2 shows a process color pixel comprising a plurality of contone color pixels.
Figure 3:
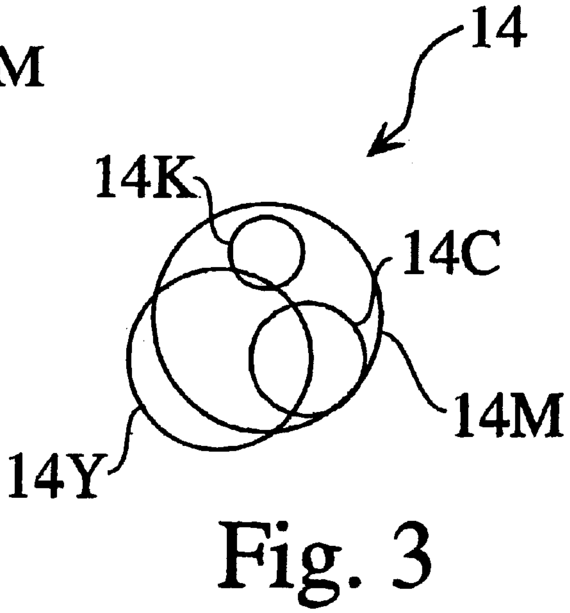
FIG. 3 shows a process color pixel comprising a plurality of contone color pixels, wherein each of the contone color pixels has a specified percentage of applied toner coverage.

FIG. 2 shows a process color pixel 14 comprising a plurality of contone color pixels 14C, 14M, 14Y and 14K. Each process color pixel 14 in a printed image 12 is a combination of the controlled application of one or more toners 40. The offset and stacking order of the color pixels 14C, 14M, 14Y and 14K, as well as the halftone pattern defined between pixels 14 across a substrate 16 is usually defined by the printer 30, 90 used (FIGS. 5, 9–11). Some halftone features are sometimes specified by the user. FIG. 3 shows a process color pixel 14 comprising a plurality of contone color pixels 14C, 14M, 14Y and 14K, wherein each of the contone color pixels 14 has a specified percentage of applied toner coverage. In the color pixel 14 shown, there is a large applied percentage of magenta (M) 40m and yellow (Y) 40y toner, and a low applied percentage of cyan (C) 40c and black (K) 40k toner.

Figure 4:
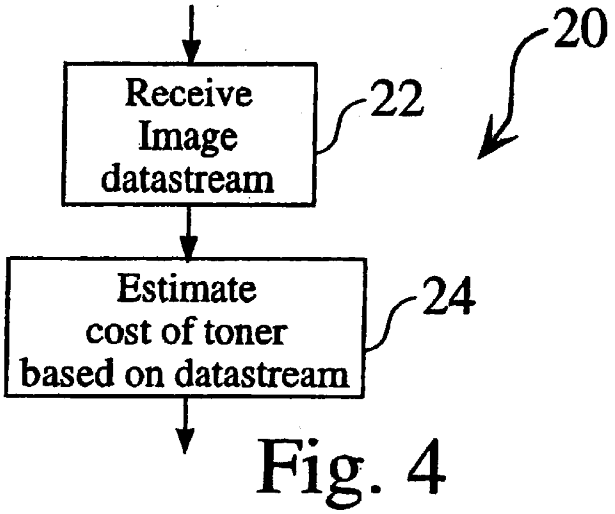
FIG. 4 is a flowchart of a basic toner usage estimation process.

FIG. 4 is a flowchart of a basic toner usage estimation process 20, wherein a image datastream is first received 22. Based on the image datastream 28 (FIG.5), the datastream 28 is analyzed to count the specified toner density of each pixel 14 within an image to be printed 12, and the cost of toner is estimated 24 based on the image datastream 28.

The toner usage estimation process uses image data to determine the cost of printing an image 12 on a substrate 16, based on a calculated estimate of toner use for a given image 12. The estimated cost can be used for accounting and job estimation purposes, either internally to a business, or externally, such as for billing purposes by a print shop to a customer. Printed pages 16 that use more toner 40 (40c, 40m, 406, 40k), particularly more color toner 40c, 40m, and 40y, typically cost more to print than pages that use less toner. By providing an estimate of the use of toner 40 to produce a printed page 16, the toner usage estimation process 20 can be used to charge customers or departments, based on estimated job costs.

Figure 5:
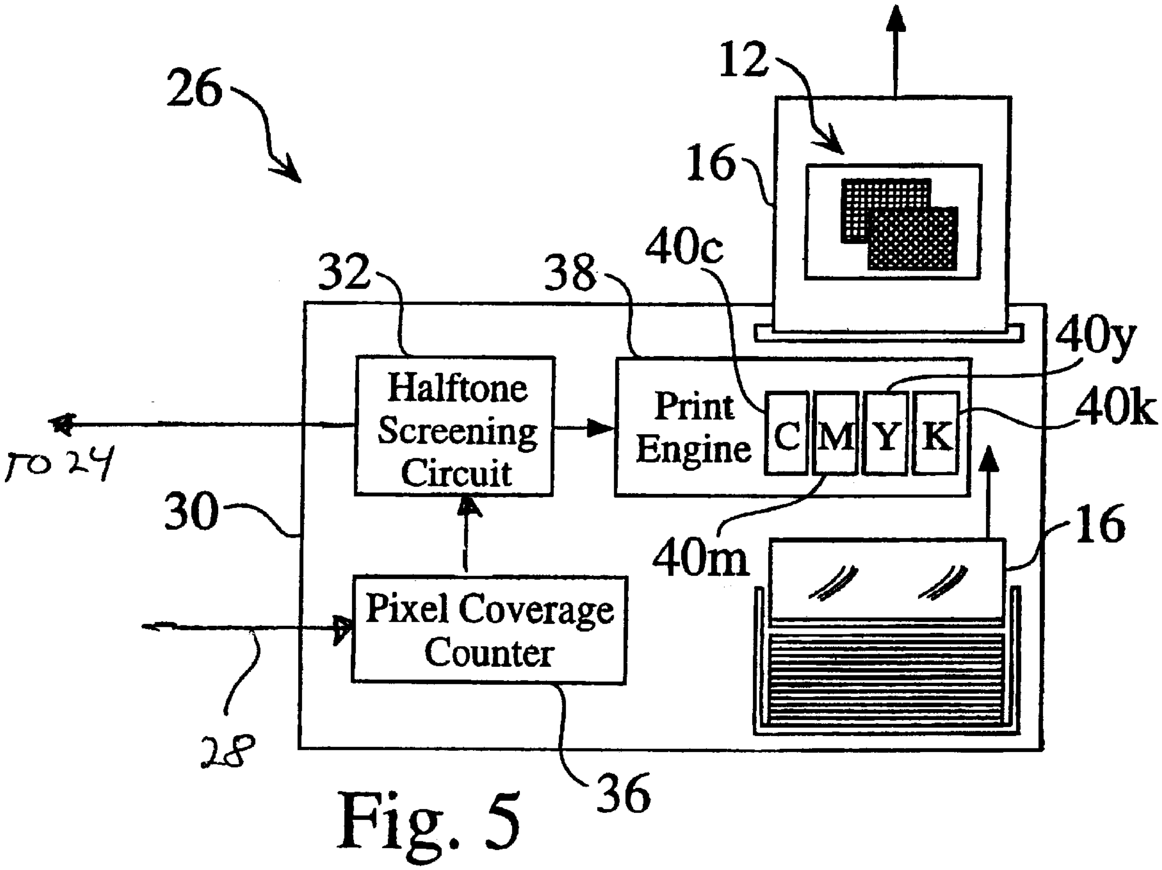
FIG. 5 is a block diagram of one embodiment of the toner usage estimation system configured within a printer.

FIG. 5 is a block diagram 26 of one embodiment of the toner usage estimation system 20 configured within a printer 30. An incoming image datastream signal 28 is processed by a halftone screening circuit 32, which forwards the halftone information to a print engine 38. The print engine 38 selectively applies one or more toners 40 to define a printed image 12 on a substrate 16. To estimate toner usage, a pixel coverage counter 36 receives 22 the image datastream 28, and forwards the mapping information, so that the datastream 28 is analyzed to count the specified toner density of each pixel 14 within an image to be printed 12, and the cost of toner for the printed image 12 is determined. The pixel coverage counter may be, for example, an estimator that counts contone percentages before halftoning (shown in FIG. 5) or it may be an exact counter that counts pixel coverage after halftoning.

A continuous tone (contone) image bit map 46 typically uses 8 bits per plane of memory, which is not exactly what the printer 30 lays down on a printed page 16. The printer 30 applies toner to a page 16 based on an identified or processed halftone bit map. There are different halftone formats, such as dithering or screens, and are achieved either by hardware or software. Most printer engines 38 produce an analog screen halftone in hardware. The actual screening is calculated and used by the printer 30 to control the application of toner 40 within a print engine 38.

Figure 6:
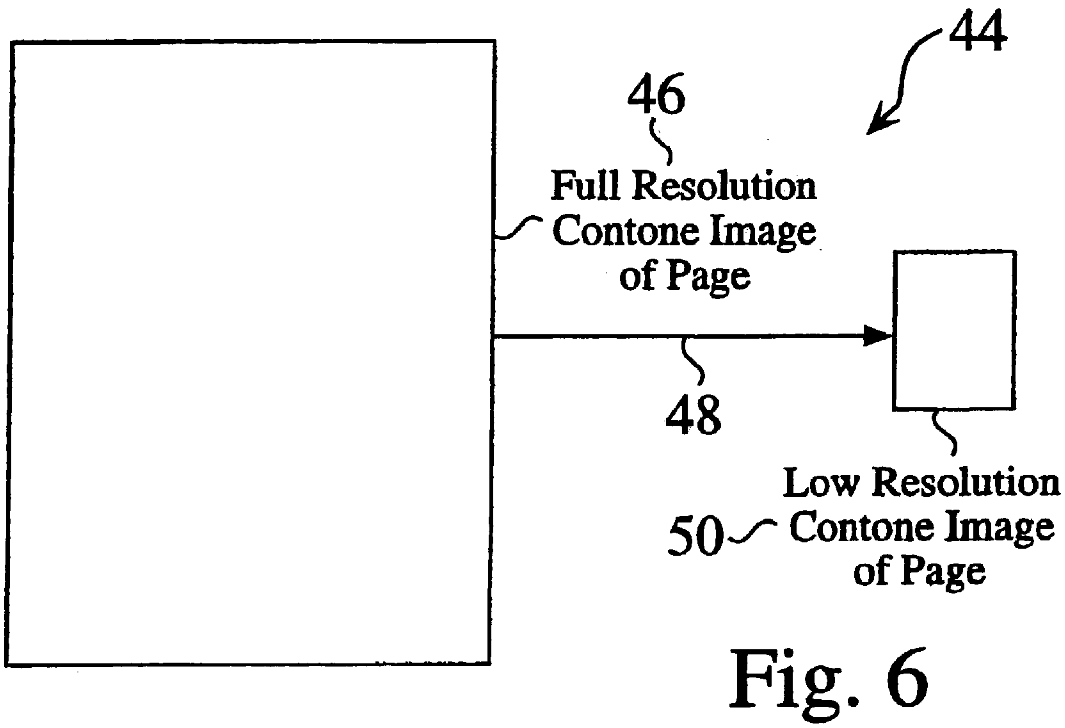
FIG. 6 shows the production of a low resolution image from a full resolution image, resulting in a reduction in file size.
Figure 7:
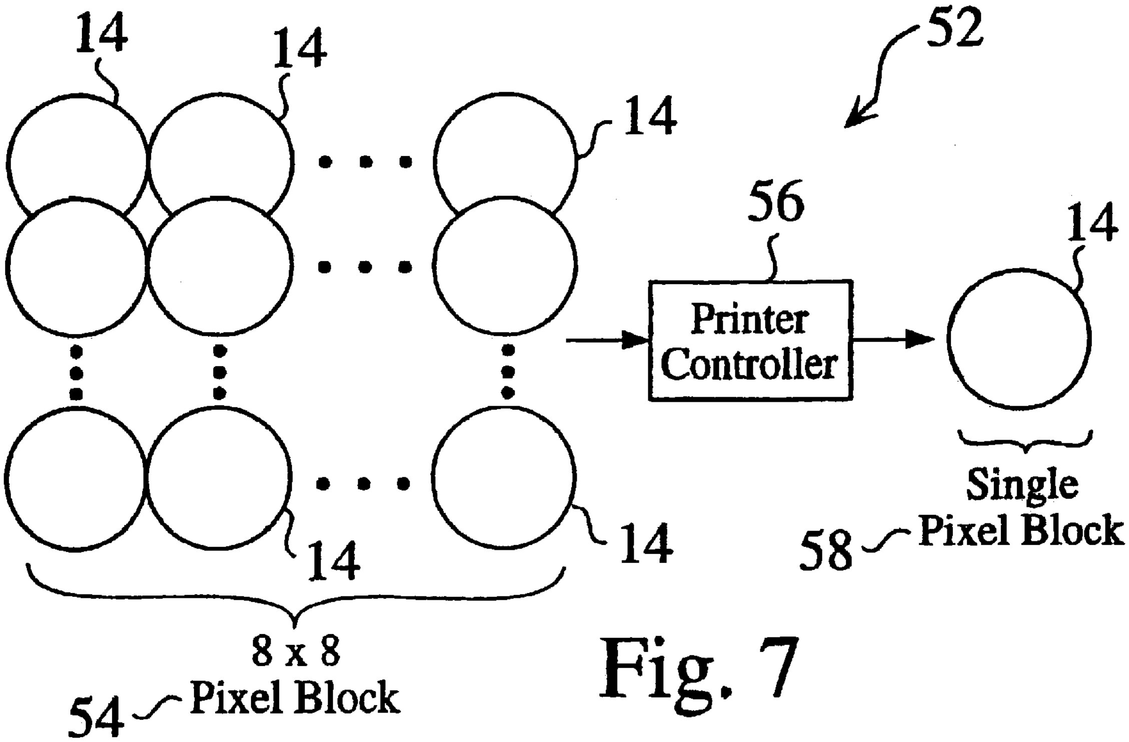
FIG. 7 shows the relative reduction in the size of a portion of a file, from a high resolution 8 by 8 pixel block to a low resolution single pixel block.

Toner Usage Estimation Using Thumbnails. FIG. 6 shows the production of a low resolution image 50 from a full resolution image 46, resulting in a reduction in file size. FIG. 7 shows the relative reduction 52 in the size of a portion of a file 46, from a high resolution 8 by 8 pixel block 54 to a low resolution single pixel block 58.

Figure 9:
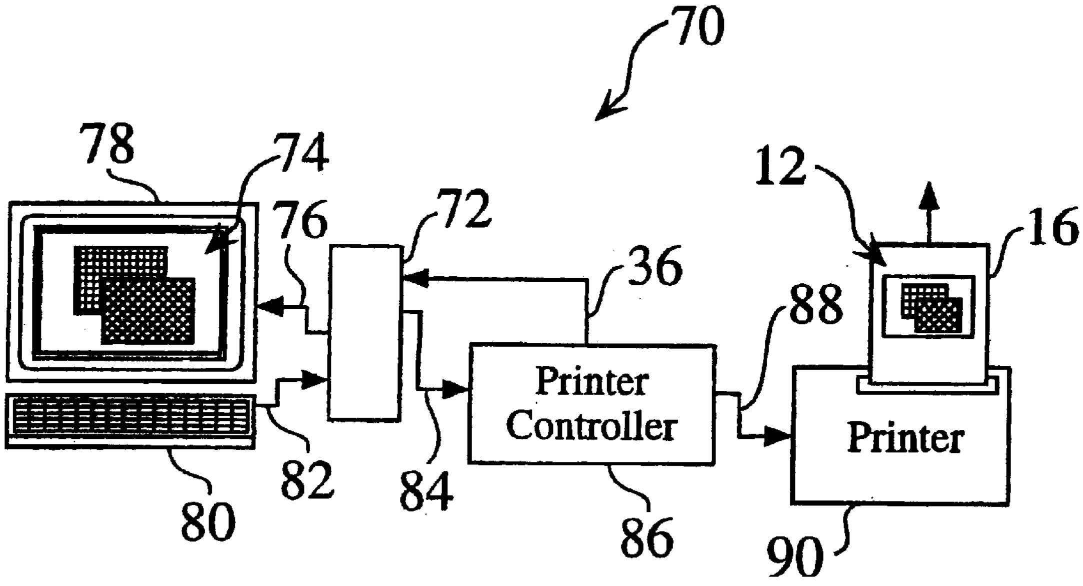
FIG. 9 is a block diagram of the toner usage estimation system configured between a client server, a printer controller and a printer.

A typical 400 dpi 8½" by 11" full color image requires 64 MB of storage. A reduced resolution image 50 (referred to as a thumbnail) typically takes up a small fraction of the required memory of the original file 46. Therefore, toner usage estimation based on a reduced resolution image 50 takes considerably less processing time. As well, thumbnail images 50 are typically provided by printer controllers 86, as preview images to a client server 72 (FIG. 9). Thumbnail images 50 are thus easily applied for toner usage estimation and accounting purposes.

Figure 8:
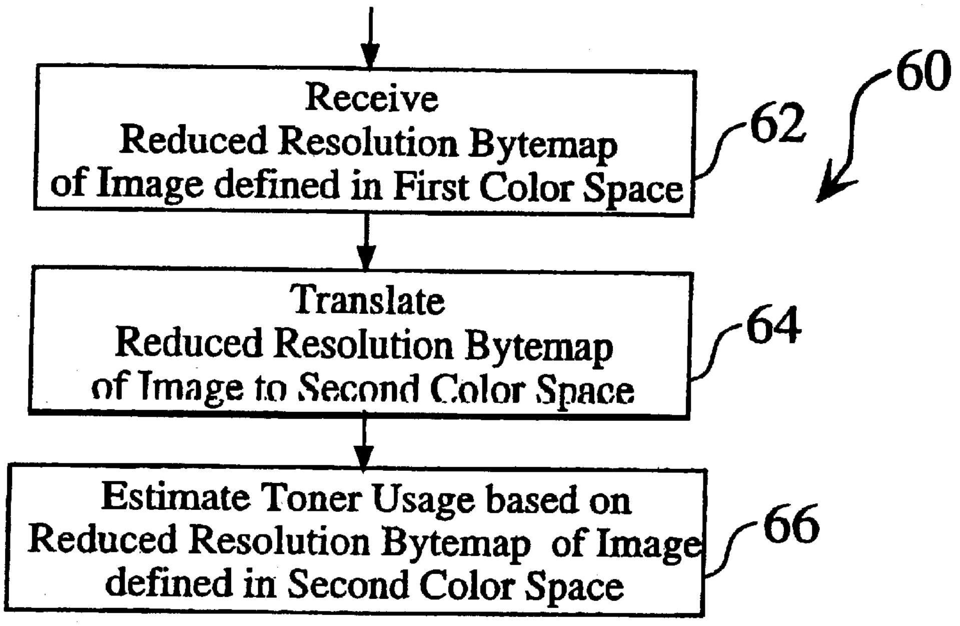
FIG. 8 is a flowchart of a toner usage estimation process that uses a reduced resolution bit map of an image.

FIG. 8 is a flowchart of a toner usage estimation process 60 that uses a reduced resolution bit map 50 of an image. The toner usage estimation process 60 comprises the following steps:

i) receiving 62 a reduced resolution bit map 50 of an image 74 residing in a first image color space;

ii) translating 64 the reduced resolution preview bit map 50 to a second image color space; and iii) estimating 66 the use of one or more toners 40c, 40m, 40y, and 40k to define the printed image 12 on a substrate 16 based upon the translated reduced resolution bit map 50.

The toner usage estimation process 60 that uses a reduced resolution bit map 50 is typically faster than a process that counts each and every pixel 14 within the datastream of a full resolution image 46. While the accuracy of the toner usage estimation process 60 is generally not as precise as toner usage estimation processes that use full resolution images 46, the estimation is adequate for most applications.

FIG. 9 is a block diagram of a toner usage estimation system 70 configured between a client server 72, a printer controller 86, and a printer 90. A file image 74 is defined in a first image color space, typically a red, green, and blue (RGB) color space. The file image 74 is can be displayed on a client server monitor 78. When a user decides to send the image file to be printed, the user enters a print command to the client server 72 through an input device 80, such as a keyboard or mouse. The image file 74 is sent to a printer controller 86. The printer controller 86 can either be internal or external to a printer 90.

Typically, image files 74 sent from a client server 72 are Postscript™ or portable document format PDFT files (standard formats of Adobe Systems, Inc., of San Jose, Calif.). Postscript™ files may contain a plurality of colorspaces. In office environments, RGB files such as provided by MicrosoftWord and Powerpoint are most common, but in graphic arts, CMYK color spaces are common, as well. The image files 74 are typically defined within a first color space, which is commonly a red, green, and blue (RGB) color space. When the image files 74 are received by the printer controller 86, the printer controller 86 translates 64 the image files from the first color space format to a second color space format, which is then sent to a printer 90. The translation process is commonly referred to as raster image processing (Ripping), and typically translates the file from a RGB color space to a contone (CMYK) color space format that a printer 90 can use to controllably apply one or more toners 40 in varying quantities to halftone pixels 14 onto a substrate 16, to produce a printed image 12.

The printer controller 86 also produces a reduced resolution image file 50, of an image to be rendered by a printer 30. The reduced resolution thumbnail 50 can either be produced by the printer controller 86, or by the client server 72. The reduced resolution thumbnail 50 is usually produced to provide remote document viewing on a remote monitor 78.

The reduced resolution thumbnail 50 is typically defined in an RGB color space, while the print engine toners are typically defined in a CMYK color space. The toner usage estimation system 70 uses an algorithm to translate the RGB thumbnail bit map 50 into a set of estimated usage of C, M, Y, and K toner 40. The toner usage estimation system 70 shown in FIG. 9 uses the reduced resolution bit map 50 provided by the print controller 86 to estimate the use of one or more toners to define an image 12 on a substrate 16. This analysis constitutes an algorithmic estimation of the amount of toner necessary to print a given page 12, 16. The estimate of toner usage can be performed by either the printer controller 86 or the client server 72. When toner usage is performed on the client server 72, the printer controller 86 is available for other print related tasks.

Figure 10:
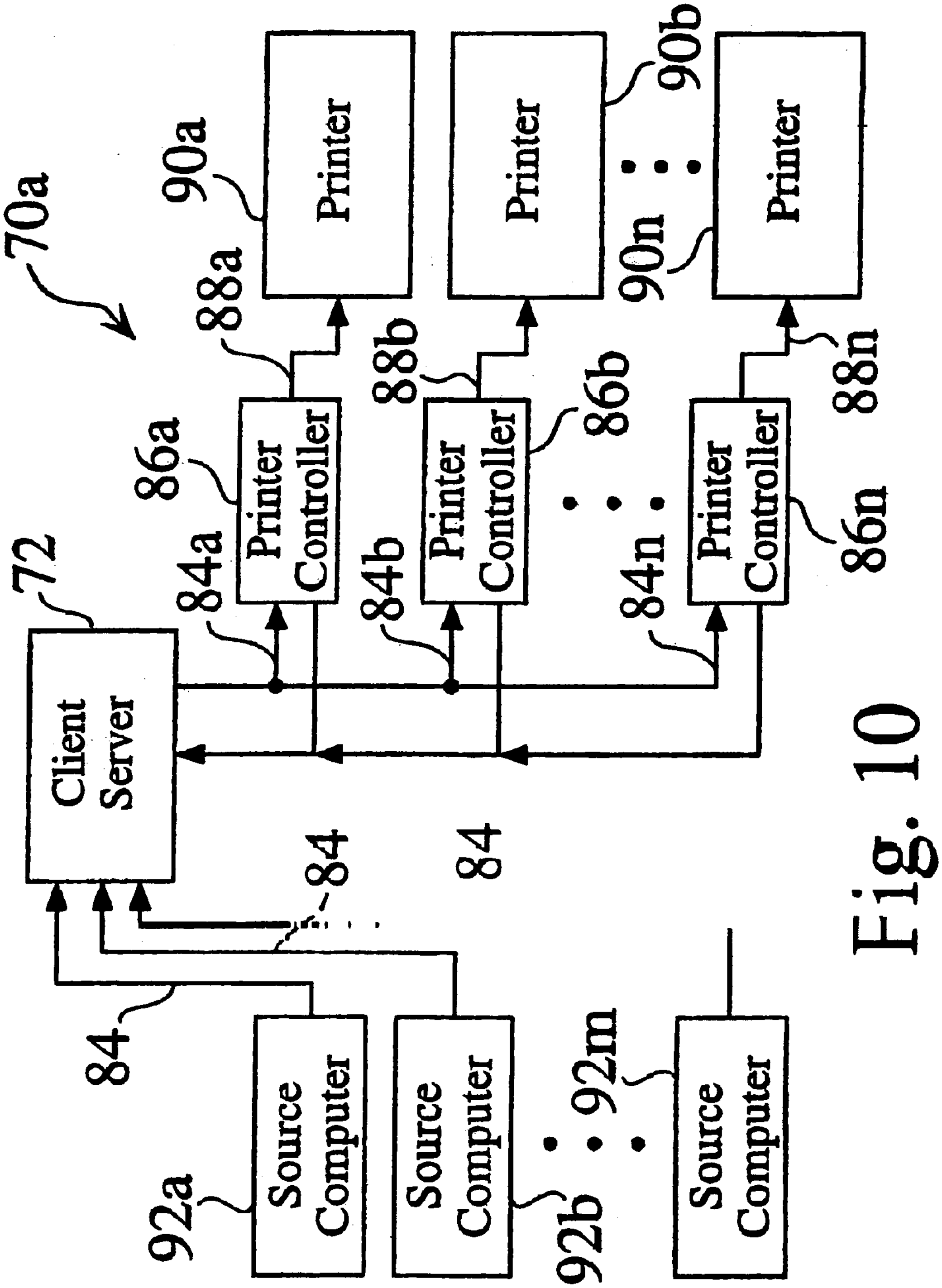
FIG. 10 is a block diagram of another embodiment of the toner usage estimation system configured between a plurality of customer computers, a client server, and a plurality of printer controllers and printers.

FIG. 10 is a block diagram of a toner usage estimation system 70*a* configured between a plurality of source computers 92*a–m*, a client server 72, and a plurality of printer controllers 86*a–n* and printers 90*a–n*. Reduced resolution bit maps 50 of one or more images are forwarded to the client server 72 from each of the printer controllers 86*a–n*. Toner usage estimation can be performed by the printer controllers 86*a–n*, by the client servers 72, or by the source computers 92*a–m*.

Figure 11:
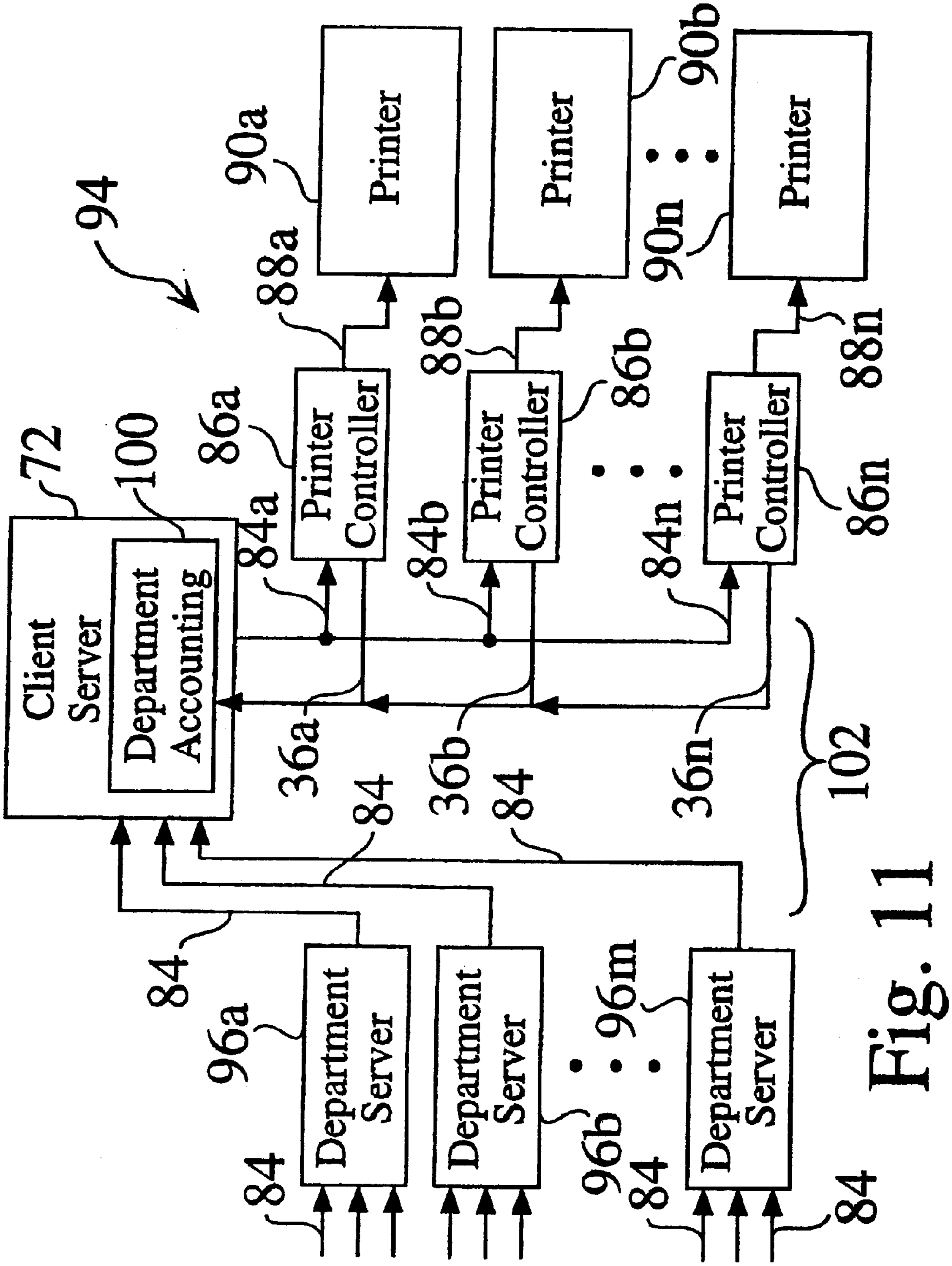
FIG. 11 is a block diagram of an alternate embodiment of the toner usage estimation system wherein a toner usage estimation processor is located between a plurality of department servers and a plurality of printer controllers and printers.

FIG. 11 is a block diagram 94 of an alternate embodiment of the toner usage estimation system, wherein a client server 72 that includes accounting software 100 is located between a plurality of department servers 96*a–m* and a plurality of printer controllers 86*a–n* and printers 90*a–n*.

The print controllers 86*a–n* are adapted to provide reduced resolution bit maps 50 of one or more images 74. The department accounting software 100 tracks print jobs sent across the network 102, collects reduced resolution bit maps 50 from each job 84 sent to one or more printers 90*a–n*, and estimates the toner usage and printing cost of each printing job 84. One application for this embodiment is to track the actual or average cost of one or more print jobs 84 sent by each of the separate stations or departments 96*a–n*, and can therefore be used for departmental accounting (e.g. while one department 96 has a large number of jobs 84, the jobs are typically low in toner usage (low page cost); a second department 96 has a low number of jobs 84, but the jobs have a very high color toner usage (a high page cost)).

Although the toner usage estimation system and its methods of use are described herein in connection with client servers and printers, the system and techniques can be implemented with other computers and image processing devices, such as scanners and copiers, or any combination thereof, as desired.

Accordingly, although the invention has been described in detail with reference to a particular preferred embodiment, persons possessing, ordinary skill in the art to which this invention pertains will appreciate that various modifications and enhancements may be made without departing from the spirit and scope of the claims that follow.

What is claimed is:

1. A process, comprising:

receiving an image datastream bit map defining an image, the image datastream bit map having at least one pixel, each of the at least one pixel having a toner density percentage value between 0 and 100 of the size of the pixel, the specified toner density percentage value being directly proportional to a specified digital pixel value;

counting the specified toner density percentage value for each of the received at least one pixels in the received image datastream bit map; and estimating use of toner to define the image on a substrate, based upon the accumulation of counted specified toner density percentage value for each of the received at least one pixels in the received image datastream bit map.

2. The process of claim 1, wherein the step of estimating relative use of toner is performed on a client server.

3. The process of claim 1, wherein the step of estimating relative use of toner is performed on a printer controller.

4. The process of claim 1, wherein the image datastream bytemap is defined in a first image color space.

5. The process of claim 4, wherein the first image color space is a RGB image color space.

6. The process of claim 4, further comprising:

translating the image datastream bit map defined in the first image color space to a second image color space; and wherein the step of estimating use of the toner to define the image on the substrate is based upon the image datastream bit map defined in the second image color space.

7. The process of claim 6, wherein the second image color space is a CMYK color space.

8. The process of claim 6, wherein the step of estimating use of the toner is performed on a client server.

9. The process of claim 6, wherein the step of estimating use of the toner is performed on a printer controller.

10. A process, comprising:

receiving a reduced resolution bit map of an image residing in a first image color space, the size of the reduced resolution bitmap being related to the size of the image by a relative reduction factor, the reduced resolution bit map having at least one pixel within a reduced resolution pixel block, each of the at least one pixel within the reduced resolution pixel block having a specified toner density percentage value between 0 and 100 of the size of the pixel, the specified toner density percentage value being directly proportional to a specified digital pixel value;

translating the reduced resolution bit map to a second image color space;

estimating use of toner to define the image on a substrate based upon the accumulation of counted specified toner density percentage value for each of the received at least one pixel within the translated reduced resolution pixel block, and scaling the accumulation of counted specified toner density percentage value for each of the received at least one pixel within the translated reduced resolution pixel block by a factor that is proportional to the relative reduction factor.

11. The process of claim 10, wherein the first image color space is an RGB color space.

12. The process of claim 10, wherein the second image color space is a contone color space.

13. The process of claim 10, wherein the second image color space is a CMYK color space.

14. The process of claim 10, wherein the step of estimating use of the toner is performed on a remote server.

15. The process of claim 10, wherein the step of estimating use of the toner is performed on a printer controller.

16. The process of claim 10, further comprising:

providing an output signal containing the estimated use of toner to define the image.

17. The process of claim 16, further comprising:

sending the output signal to a client server.

18. The process of claim 17, wherein the step of estimating use of toner to define the image on the substrate is based on the sent output signal.

19. A toner usage estimation device, comprising:

a pixel coverage counter adapted to receive an image datastream bit map defining an image from a halftone screening circuit, the image datastream bit map having at least one pixel, each of the at least one pixel having a specified toner density percentage value between 0 and 100 of the size of the pixel, the specified toner density percentage value being directly proportional to a specified digital pixel value, the pixel coverage counter also adapted to count the specified toner density percentage value for each of the received at least one pixels; and a processor adapted to estimate use of toner to define the image on a substrate, based upon the accumulation of counted specified toner density percentage for each of the received at least one pixels in the received image datastream bit map.

20. The toner usage estimation device of claim 19, wherein the image datastream bytemap is a halftone bytemap.

21. A toner usage estimation device, comprising:

a computer adapted to receive a reduced resolution bit map of an image residing in a first image color space, the size of the reduced resolution bitmap being related to the size of the image by a relative reduction factor, the reduced resolution bit map having at least one pixel within a reduced resolution pixel block, each of the at least one pixel having a specified toner density percentage value between 0 and 100 of the size of the pixel, the specified toner density percentage value being directly proportional to a specified digital pixel value;

means for translating the reduced resolution bit map to a second image color space; and an algorithm for estimating use of toner to define the image on a substrate, based upon the accumulation of a count of the specified toner density percentage value for each pixel within the translated reduced resolution pixel block, and a scaling of the accumulation by a factor that is proportional to the relative reduction factor.

22. The toner usage estimation device of claim 21, wherein the first image color space is an RGB color space.

23. The toner usage estimation device of claim 21, wherein the second image color space is a contone color space.

24. The toner usage estimation device of claim 21, wherein the second image color space is a CMYK color space.

* * * * *